(12) United States Patent
Onoi et al.

(10) Patent No.: US 6,180,703 B1
(45) Date of Patent: Jan. 30, 2001

(54) RUBBER COMPOSITION

(75) Inventors: Hidekazu Onoi; Kazunori Ishikawa; Hiroyuki Kaido, all of Hiratsuka (JP)

(73) Assignee: The Yokohama Rubber Co., Ltd., Tokyo (JP)

( * ) Notice: Under 35 U.S.C. 154(b), the term of this patent shall be extended for 0 days.

(21) Appl. No.: 09/171,814

(22) PCT Filed: Feb. 9, 1998

(86) PCT No.: PCT/JP98/00520

§ 371 Date: Oct. 27, 1998

§ 102(e) Date: Oct. 27, 1998

(87) PCT Pub. No.: WO98/38246

PCT Pub. Date: Sep. 3, 1998

(30) Foreign Application Priority Data

Feb. 28, 1997 (JP) .................................................... 9-046659

(51) Int. Cl.$^7$ ................................ C08K 5/54; A32B 1/14; B32B 9/04
(52) U.S. Cl. ...................... 524/265; 524/261; 524/266; 524/267; 524/268; 524/505; 524/506; 36/87; 36/32 R; 36/34 A; 138/DIG. 7; 198/957; 428/447
(58) Field of Search ...................... 524/265, 261, 524/266, 267, 268, 505, 506; 36/87, 32 R, 34 A; 138/DIG. 7; 428/447

(56) References Cited

U.S. PATENT DOCUMENTS 4,857,593 * 8/1989 Leung et al. .......................... 524/265
6,015,850 * 1/2000 Nakamura et al. .................. 524/188

FOREIGN PATENT DOCUMENTS

| 2-300249 | 12/1990 | (JP) . |
| 3-57630 | 3/1991 | (JP) . |
| 5-98051 | 4/1993 | (JP) . |
| 5-132586 | 5/1993 | (JP) . |
| 96/29364 * | 9/1996 | (WO) . |

* cited by examiner

*Primary Examiner*—Robert Dawson
*Assistant Examiner*—Jeffrey B. Robertson
(74) *Attorney, Agent, or Firm*—Finnegan, Henderson, Farabow, Garrett & Dunner, L.L.P.

(57) ABSTRACT

Rubber compositions for footwear, conveyor belt covers, rolls, hoses, cables, rubberized fabrics, and grips containing (A) an elastomer, (B) 5 to 150 parts by weight of a filler, and (C) a polysiloxane represented by the formula (I):

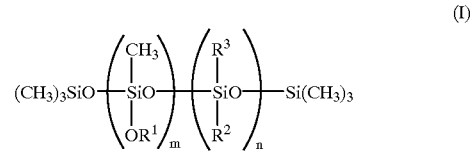

(I)

wherein $R^1$, $R^2$, $R^3$, m, and n are as defined in the specification, having an average degree of polymerization of 3 to 1000 in a specific ratio with respect to the filler (B) and footwear, conveyor belt covers, rolls, hoses, cables, rubberized fabrics, and grips comprising these rubber compositions.

21 Claims, 1 Drawing Sheet

RUBBER COMPOSITION

TECHNICAL FIELD

The present invention relates to a rubber composition, more specifically relates to a rubber composition superior in the properties required for applications such as footwear, conveyor belt covers, rolls, hoses, cables, rubberized fabrics, and grips, depending upon those applications and relates to footwear, conveyor belt covers, rolls, hoses, cables, rubberized fabrics, and grips which are formed by such a rubber composition in whole or part.

BACKGROUND ART

In recent years, various processed products formed from rubber or elastomers have been used in a wide variety of fields. These processed products use, as the starting materials, rubber compositions which are comprised mainly of rubber or elastomers and secondarily contain various types of fillers, additives, coloring agents, reinforcing agents, etc. so as to both secure the inherent properties of the rubber or elastomer and also impart or improve various properties required for the specific applications. In general, a rubber or elastomer alone cannot give the required reinforcement, and therefore, carbon black is compounded or formulated as a filler. However, silica etc. is sometimes compounded, together with the carbon black or in place of the carbon black, when the rubber product required is not black. For example, in the applications such as footwear, conveyor belt covers, rolls, hoses, cables, rubberized fabrics, grips, various colors are required, depending upon the applications.

However, rubber compositions containing silica, suffer from phenomena such as the increase in the viscosity, the scorching, the delayed vulcanization, when unvulcanized, which cause inferior processability or poor productivity. These unique phenomena in rubber compositions containing silica are believed to be due to the silanol groups present on the silica surface. That is, the increase in the viscosity is due to the cohesion of the silanol groups, which forms structural body in the rubber composition, whereby the viscosity is increased, the vulcanization accelerator etc. are adsorbed by the polarity of the silanol groups and, as a result, the vulcanization reaction is delayed, the performance in mixing is decreased due to the insufficient compatibility with the nonpolar rubber and, as a result, the processability of the unvulcanized rubber composition is decreased.

Further, silane coupling agents are often used together with rubber compositions containing silica. However, silanol groups are also present in the internal cavities of the silica particles. These silanol groups are reacted with the silane coupling agent to cause a loss of the silane coupling agent and, as a result, the reinforcing effect is decreased. Therefore, there was the problem that a large amount of silane coupling agent had to be compounded.

Various methods have been proposed in the past to solve these problems unique to rubber compositions containing silica. For example, methods have been proposed of adding a polar substance such as diethylene glycol or a fatty acid (see *Rubber Industry Handbook*, 4th edition; *Tire Technology International* 1995, p. 107 to 108; JP-A-6-248116, etc.). However, according to these methods, when the polar compounding agent such as diethylene glycol is added to the rubber composition, the adsorbing phenomenon of polar compounding agents such as vulcanization accelerator is prevented to a certain extent, but they cannot completely prevent it. They cannot prevent substances chemically bonding with silica such as the silane coupling agent from bonding in the internal cavities of the silica and, therefore, cannot be said to be methods which can be fully applied in practice to completely resolve all problems.

Further, elimination of these problems inherent to rubber compositions containing silica and the realization of excellent properties in such rubber compositions depending upon the applications of the final products have been sought. For example, in rubber compositions used for the soles of footwear or portions of boots etc. exposed to harsh wear, a superior abrasion resistance of the vulcanizate is sought. Further, in rubber covers of conveyor belts, since abrasion occurs due to the carrying of the transported loads and cracks occur due to the flexing at the pulley portions, a superior abrasion resistance and crack resistance are sought. In rubber compositions used for rolls, due to the abrasion caused by carrying the transported iron metal, paper, etc. and the load due to the transported products, a superior abrasion resistance and bondability with iron metal of the vulcanizate are sought. In rubber compositions used for hoses, since the hoses expand due to the water pressure, oil pressure, etc. and the hoses contact each other or other objects, a superior modulus and abrasion resistance are sought. In rubber compositions used for coverings of cables, considering the lifetime of the products, a superior abrasion resistance is sought. Further, in rubber compositions used for rubberized fabric, in recent years abrasion resistance has been increasingly demanded even for rubberized clothing such as boat parkers. Further, even in the grips attached to the gripping portions of equipment or parts such as golf clubs, bicycles, motorcycles, agricultural machinery, due to the abrasion which occurs each time the user or worker grips them, abrasion resistance is sought in the rubber compositions for the grips as well.

DISCLOSURE OF INVENTION

Accordingly, an object of the present invention is to provide rubber compositions which solve the problems inherent to rubber compositions containing silica and are superior in processability in the unvulcanized state and the physical properties of the vulcanizates and which are superior in the properties sought for the applications of footwear, conveyor belt covers, rolls, hoses, cables, rubberized fabrics, and grips depending upon those applications.

In accordance with the present invention, there is provided a rubber composition comprising (A) an elastomer, (B) a filler, (C) a polysiloxane having the formula (I) having an average degree of polymerization of 3 to 1000:

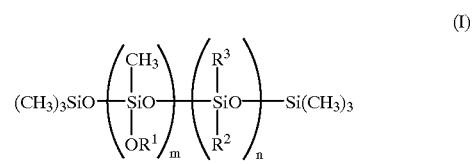

wherein, $R^1$ is a $C_1$ to $C_{18}$ substituted or unsubstituted monovalent hydrocarbon group which may contain an ether bond, $R^2$ is a hydrogen atom or a $C_1$ to $C_{18}$ substituted or unsubstituted monovalent hydrocarbon group, $R^3$ is a methyl group or phenyl group, m is an integer of 1 or more, and n is 0 or a positive integer and, optionally, (D) a silane coupling agent.

Namely, according to the first embodiment of the present invention, there is provided a rubber composition for footwear comprising (A) 100 parts by weight of an elastomer, (B) 5 to 150 parts by weight of a filler, and (C) 1 to 100 parts by weight, based upon 100 parts by weight of the filler (B), of a polysiloxane represented by the formula (I) having an average degree of polymerization of 3 to 1000.

According to the second embodiment of the present invention, there is provided a rubber composition for a cover of a conveyor belt comprising (A) 100 parts by weight of an elastomer, (B) 5 to 150 parts by weight of a filler, and (C) 1 to 50 parts by weight, based upon 100 parts by weight of the filler (B), of a polysiloxane represented by the formula (I) having an average degree of polymerization of 3 to 1000.

According to the third embodiment of the present invention, there is provided a rubber composition for a roll comprising (A) 100 parts by weight of an elastomer, (B) 5 to 150 parts by weight of a filler, and (C) 1 to 100 parts by weight, based upon 100 parts by weight of the filler (B), of a polysiloxane represented by the formula (I) having an average degree of polymerization of 3 to 1000.

According to the fourth embodiment of the present invention, there is provided a rubber composition for a hose comprising (A) 100 parts by weight of an elastomer, (B) 5 to 200 parts by weight of a filler, and (C) 1 to 40 parts by weight, based upon 100 parts by weight of the filler (B), of a polysiloxane represented by the formula (I) having an average degree of polymerization of 3 to 1000.

According to the fifth embodiment of the present invention, there is provided a rubber composition for a cable comprising (A) 100 parts by weight of an elastomer, (B) 5 to 150 parts by weight of a filler, and (C) 1 to 40 parts by weight, based upon 100 parts by weight of the filler (B), of a polysiloxane represented by the formula (I) having an average degree of polymerization of 3 to 1000.

According to the sixth embodiment of the present invention, there is provided a rubber composition for a rubberized fabric comprising (A) 100 parts by weight of an elastomer, (B) 5 to 250 parts by weight of a filler, and (C) 1 to 100 parts by weight, based upon 100 parts by weight of the filler (B), of a polysiloxane represented by the formula (I) having an average degree of polymerization of 3 to 1000.

According to the seventh embodiment of the present invention, there is provided a rubber composition for a grip comprising (A) 100 parts by weight of an elastomer, (B) 5 to 250 parts by weight of a filler, and (C) 1 to 100 parts by weight, based upon 100 parts by weight of the filler (B), of a polysiloxane represented by the formula (I) having an average degree of polymerization of 3 to 1000.

Further, according to the present invention, there are provided footwear, conveyor belt covers, rolls, hoses, cables, rubberized fabrics, and grips comprised of these rubber composition for footwear, rubber composition for conveyor belt covers, rubber composition for rolls, rubber composition for hoses, rubber composition for cables, rubber composition for rubberized fabric, and rubber composition for grips.

BRIEF DESCRIPTION OF THE DRAWINGS

The present invention will now be explained with reference to the drawing, wherein.

BEST MODE FOR CARRYING OUT THE INVENTION

Figure 1:
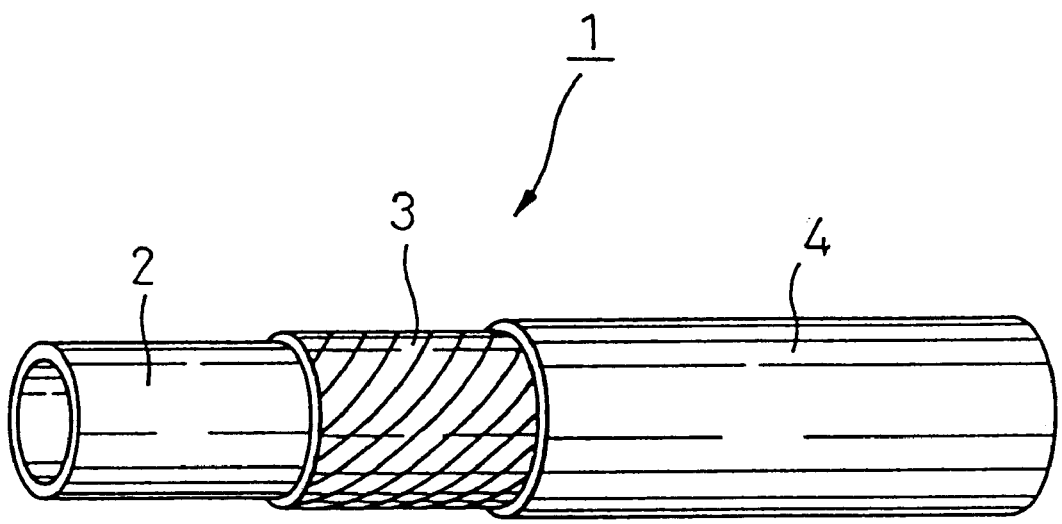
FIG. 1 is a view for explaining the structure of a test hose used for measurement of the abrasion resistance of a rubber composition for a hose.

The detailed explanation will now be given of the rubber composition for footwear, rubber composition for conveyor belt covers, rubber composition for rolls, rubber composition for hoses, rubber composition for cables, rubber composition for rubberized fabrics, and rubber composition for grips of the present invention (hereinafter these rubber compositions will be referred to all together as "the rubber compositions of the present invention" except when explaining these rubber compositions individually).

The present inventors found that, by blending a rubber composition having as essential ingredients (A) an elastomer, (B) a filler, and (C) a polysiloxane having the formula (I), it was possible to obtain a rubber composition superior in the processability in the unvulcanized state and the various physical properties of the vulcanizates and found that, by using a silane coupling agent in combination, it was possible to improve the abrasion resistance. Further, they engaged in intensive studies to find the proportions of the composition for satisfactorily obtaining the properties required for rubber compositions used for various applications and, as a result, found suitable rubber compositions for a rubber composition for footwear, rubber composition for conveyor belt covers, rubber composition for rolls, rubber composition for hoses, rubber composition for cables, rubber composition for rubberized fabrics, and rubber composition for grips, whereby the present invention was completed.

The elastomer (A) which is one of the essential ingredients of the rubber composition of the present invention is not particularly limited and may be any elastomer commonly used for various rubber compositions or may be suitably selected depending upon the application and the required properties etc. For example, diene elastomers, olefin elastomers, etc. may be mentioned. As specific examples of diene elastomers, natural rubber (NR), polyisoprene rubber (IR), polychloroprene rubber (CR), styrene-butadiene copolymer rubber (SBR), polybutadiene rubber (BR), acrylonitrile-butadiene copolymer rubber (NBR), butyl rubber (IIR), etc. may be mentioned. As specific examples of the olefin elastomers, ethylene-propylene copolymer rubbers (EPM, EPDM), ethylene-vinyl acetate copolymer (EVA), ethylene-methacrylate copolymer (EMA), ethylene-methyl methacrylate copolymer (EMMA), etc. may be mentioned.

Further, the filler, which is the ingredient (B) of the rubber composition of the present invention may be, of course, general inorganic fillers (e.g., calcium carbonate, clay, talc, diatomaceous earth, mica, alumina, aluminum sulfate, barium sulfate, calcium sulfate, etc.) and further reinforcing agents such as carbon black, silica. In the present invention, as the filler, these may be used alone or in combination.

Among these, in particular, silica is poor in mixability and processability and therefore, the effect of improvement of the present invention is remarkable. As the silica used, hydrous silicic acid having a nitrogen specific surface area of 50 to 300 $m^2/g$ used for rubber may be mentioned. As specific examples of the silica, Carplex (Shionogi & Co.), Tokusil (Tokuyama Corp.), Starsil (Kamijima Kagaku), Silton (Mizusawa Industrial Chemicals Ltd.), Vulkasil (Bayer), Ultrasil (Degussa), etc. may be mentioned.

Further, in formula (I) showing the polysiloxane used as the ingredient (C) of the rubber composition of the present invention, $R^1$ is a $C_1$ to $C_{18}$ substituted or unsubstituted monovalent hydrocarbon group which may have an ether bond. As the substituted or unsubstituted monovalent hydrocarbon group, for example, a methyl group, ethyl group, propyl group, pentyl group, hexyl group, stearyl group, etc. may be mentioned. Further, as the group having an ether bond, an ethoxyethyl group, butoxyethyl group, etc. may be mentioned. $R^2$ is a hydrogen atom or a substituted or unsubstituted $C_1$ to $C_{18}$, preferably $C_2$ to $C_{18}$, hydrocarbon group, which may contain a heteroatom. As the $C_1$ to $C_{18}$ hydrocarbon group, for example, a methyl group, ethyl group, propyl group, or a residual group based on styrene, α-methylstyrene, α-methylstyrene dimer, chloromethylstyrene, acrylonitrile, acrylglycidyl ether, phenylglycidyl ether, limonene, isooctene, vinylcyclohexene, etc. may be mentioned. $R^3$ is a methyl group or phenyl group. Further, m is an integer of 1 or more, while n is 0 or a positive integer. m+n is 3 or more, preferably 10 or more, in view of the boiling point of polysiloxane etc. In particular, those having 10 to 50 are easily available as a raw material. Further, in the polysiloxane used as the ingredient (C) in the present invention, a repeating unit having an OR group at the side chain is an essential constituent unit and at least one thereof should be present in the molecule. Further, repeating units having the groups $R^2$ and $R^3$ at the side chains are constituent units introduced, if necessary.

Further, the polysiloxane is a polymer or oligomer covering the surface of the silica particles and having, as a magnitude indicating the lubricating effect, an average degree of polymerization of 3 to 1000, preferably an average degree of polymerization of 10 to 1000.

In the rubber composition of the present invention, it is believed that, by adding this polysiloxane, the silanol groups of the silica contained in the rubber composition react with the polysiloxane so that the silica surface is covered with the polysiloxane. Therefore, the increase in the viscosity of the rubber composition due to the cohesion of the silanol groups is avoided and a composition having a lower viscosity than the conventional rubber compositions containing silica is obtained. Further, it is possible to avoid the phenomenon of the decrease in the mixing performance of the mixture due to the insufficient compatibility with nonpolar rubber resulting from the polarity of the silanol groups in conventional rubber compositions. That is, it is possible to improve the processability of the unvulcanized composition. Further, the vulcanization delay caused by the adsorption of the vulcanization accelerator etc, due to the polarity of the silanol groups is also improved. Further, it is possible to avoid loss of the silane coupling agent, explained below, due to the reaction with the silanol groups present in the internal cavities of the silica particles, and therefore, it is possible to decrease the amount of the silane coupling agent added.

The polysiloxane represented by the formula (I) may in general be synthesized, for example, by reacting an Si—H— group containing polysiloxane with an alcohol in the presence of a transition metal catalyst.

As the Si—H group containing polysiloxane, the following formulae may be mentioned:

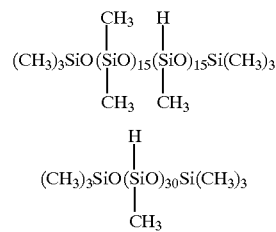

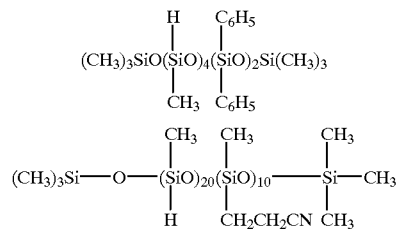

Among these, in view of the inexpensive price, the use of methyl hydrogen polysiloxane is particularly preferred.

Further, as the alcohol usable as the reaction starting material, for example, methanol, ethanol, propanol, butanol, pentanol, heptanol, octanol, octadecanol, phenol, benzyl alcohol, etc. may be mentioned. Further, alcohols having oxygen atoms such as ethylene glycol monomethyl ether, diethylene glycol monomethyl ether, may be mentioned. Among these, from the viewpoint of the improvement in the processability, ethanol is particularly preferred.

Further, as the transition metal catalyst, for example, chloroplatinic acid, a platinum-ether complex, platinum-olefin complex, $PdCl_2(PPh_3)_2$, $RhCl(PPh_3)_2$, a mixture of $CuO_2$ and $Me_2NCH_2$—$CH_2NMe_2$, tin octylate, zinc octylate, etc. may be mentioned. Further, acidic and basic catalysts may be used.

Further, various types of organic groups may be introduced into the polysiloxane depending upon the type of the rubber. As the method of introducing the organic groups into the polysiloxane, the method of reacting the Si—H group of the polysiloxane with an organic compound having a double bond using the above catalysts may be mentioned. As the organic compound having a double bond which may be used, ethylene, styrene, α-methylstyrene, α-methylstyrene dimer, chloromethylstyrene, acrylonitrile, acrylglycidyl ether, phenylglycidyl ether, limonene, isooctene, vinylcyclohexene, etc. may be mentioned.

The rubber compositions of the present invention include the elastomer (A), filler (B), and polysiloxane (C) as essential ingredients and contain other ingredients of suitable types and proportions depending upon the properties sought for various applications such as footwear, conveyor belt covers, rolls, hoses, cables, rubberized fabrics, grips.

In a rubber composition for footwear, as the ingredient (A), that is, the elastomer, for example, one containing NR and/or NBR in an amount of at least 50% by weight of the elastomer, preferably 55 to 100% by weight, may be used. When the content of NR and NBR in the elastomer (A) is less than 50% by weight, the vulcanized properties required for a rubber composition for footwear or the abrasion resistance, oil resistance, etc. of the vulcanizate are insufficient.

Further, as ingredients mixed in as the ingredient (A) other than NR or NBR, for example, polyisoprene rubber (IR), styrene-butadiene copolymer rubber (SBR), polybutadiene rubber (BR), polychloroprene rubber (CR), ethylene-propylene copolymer rubber (EPM, EPDM), etc. may be used.

In the rubber composition for footwear, the ratio of the elastomer (A) and the filler (B) is 5 to 150 parts by weight of the filler (B) based upon 100 parts by weight of the elastomer (A), preferably 10 to 100 parts by weight of the filler (B) based upon 100 parts by weight of the elastomer (A). If the ratio of the filler (B) based upon 100 parts by weight of the elastomer (A) is less than 5 parts by weight, the effect of compounding is not obtained, while if more than 150 parts by weight, the processability is impaired.

Further, the proportion of the polysiloxane of the ingredient (C) in the rubber composition for footwear is an amount giving 1 to 100% by weight of the amount of the filler (B), preferably 2 to 40% by weight. If the amount of the polysiloxane (C) is less than 1% by weight of the amount of the filler (B), the effect of compounding is small, while if more than 100% by weight of the amount of the filler (B), there is the danger of bleed-out from the vulcanizate.

The elastomer of the ingredient (A) in the rubber composition for a conveyor belt cover is not particularly limited. For example, NR, SBR, BR, NBR, CR, EPM, EPDM, etc. may be mentioned.

In the rubber composition for a conveyor belt cover, the ratio of the elastomer (A) and the filler (B) is 5 to 200 parts by weight of the filler (B) based upon 100 parts by weight of the elastomer (A), preferably 10 to 180 parts by weight of the filler (B) based upon 100 parts by weight of the elastomer (A). If the ratio of the filler (B) based upon 100 parts by weight of the elastomer (A) is less than 5 parts by weight, the effect of compounding is not obtained, while if more than 200 parts by weight, the processability is impaired.

Further, the proportion of the polysiloxane of the ingredient (C) in the rubber composition for a conveyor belt cover is an amount giving 1 to 50% by weight of the amount of the filler (B), preferably 2 to 40% by weight. If the amount of the polysiloxane (C) is less than 1% by weight of the amount of the filler (B), the effect of compounding is small, while if over 50% by weight of the amount of the filler (B), there is the danger of bleed-out from the vulcanizate.

The elastomer of the ingredient (A) in the rubber composition for a roll is not particularly limited. For example, NR, SBR, CR, BR, NBR, etc. may be mentioned.

In the rubber composition for a roll, the ratio of the elastomer (A) and the filler (B) is 5 to 150 parts by weight of the filler (B) based upon 100 parts by weight of the elastomer (A), preferably 10 to 100 parts by weight of the filler (B) based upon 100 parts by weight of the elastomer (A). If the ratio of the filler (B) based upon 100 parts by weight of the elastomer (A) is less than 5 parts by weight, the effect of compounding is not obtained, while if more than 150 parts by weight, the processability is impaired.

Further, the proportion of the polysiloxane of the ingredient (C) in the rubber composition for a roll is an amount giving 1 to 100% by weight of the amount of the filler (B), preferably 2 to 40% by weight. If the amount of the polysiloxane (C) is less than 1% by weight of the amount of the filler (B), the effect of compounding is not obtained, while if more than 100% by weight of the amount of the filler (B), there is the danger of bleed-out from the vulcanizate.

In a rubber composition for a hose, as the elastomer of the ingredient (A), at least one elastomer selected from diene elastomers and olefin elastomers may be used.

In the rubber composition for a hose, the ratio of the elastomer (A) and the filler (B) is 5 to 200 parts by weight of the filler (B) based upon 100 parts by weight of the elastomer (A), preferably 10 to 180 parts by weight of the filler (B) based upon 100 parts by weight of the elastomer (A). If the ratio of the filler (B) based upon 100 parts by weight of the elastomer (A) is less than 5 parts by weight, the effect of compounding is not obtained, while if more than 200 parts by weight, the processability is impaired.

Further, the proportion of the polysiloxane of the ingredient (C) in the rubber composition for a hose is an amount giving 1 to 40% by weight of the amount of the filler (B), preferably 2 to 20% by weight. If the amount of the polysiloxane (C) is less than 1% by weight of the amount of the filler (B), the effect of compounding is not obtained, while if more than 20% by weight of the amount of the filler (B) blended, there is the danger of bleed-out from the vulcanizate.

In a rubber composition for a cable, as the elastomer of the ingredient (A), at least one elastomer selected from diene elastomers and olefin elastomers may be used. As the diene elastomer, for example, NR, SBR, IR, BR, NBR, CR, etc. may be mentioned. Further, as the olefin elastomer, for example, EPM, EPDM, EVA, EMA, EMMA, etc. may be mentioned.

In the rubber composition for a cable, the ratio of the elastomer (A) and the filler (B) is 5 to 150 parts by weight of the filler (B) based upon 100 parts by weight of the elastomer (A), preferably 10 to 100 parts by weight of the filler (B) based upon 100 parts by weight of the elastomer (A). If the ratio of the filler (B) based upon 100 parts by weight of the elastomer (A) is less than 5 parts by weight, the effect of compounding is not obtained, while if more than 150 parts by weight, the processability is impaired.

Further, the proportion of the polysiloxane of the ingredient (C) in the rubber composition for a cable is an amount giving 1 to 40% by weight of the amount of the filler (B), preferably 2 to 20% by weight. If the amount of the polysiloxane (C) is less than 1% by weight of the amount of the filler (B), the effect of compounding is not obtained, while if more than 40% by weight of the amount of the filler (B), there is the danger of bleed-out from the vulcanizate.

In a rubber composition for a rubberized fabrics, the elastomer of the ingredient (A) is not particularly limited. For example, diene elastomers such as NR, SBR, BR, NBR, CR, and olefin elastomers such as EPM, EPDM, may be mentioned.

In the rubber composition for a rubberized fabrics, the ratio of the elastomer (A) and the filler (B) is 5 to 250 parts by weight of the filler (B) based upon 100 parts by weight of the elastomer (A), preferably 10 to 200 parts by weight of the filler (B) based upon 100 parts by weight of the elastomer (A). If the ratio of the filler (B) based upon 100 parts by weight of the elastomer (A) is less than 5 parts by weight, the effect of compounding is not obtained, while if more than 250 parts by weight, the processability is impaired.

Further, the proportion of the polysiloxane of the ingredient (C) in the rubber composition for a rubberized fabrics is an amount giving 1 to 100% by weight of the amount of the filler (B), preferably 2 to 40% by weight. If the amount of the polysiloxane (C) is less than 1% by weight of the amount of the filler (B), the effect of compounding is not obtained, while if more than 100% by weight of the amount of the filler (B), there is the danger of bleed-out from the vulcanizate.

In a rubber composition for a grip, the elastomer of the ingredient (A) is not particularly limited. For example, diene elastomers such as NR, SBR, BR, NBR, and olefin elastomers such as EPM, EPDM, may be mentioned.

In the rubber composition for a grip, the ratio of the elastomer (A) and the filler (B) is 5 to 100 parts by weight of the filler (B) based upon 100 parts by weight of the elastomer (A), preferably 10 to 80 parts by weight of the filler (B) based upon 100 parts by weight of the elastomer (A). If the ratio of the filler (B) based upon 100 parts by weight of the elastomer (A) is less than 5 parts by weight, the effect of compounding is not obtained, while if more than 100 parts by weight, the processability is impaired.

Further, the proportion of the polysiloxane of the ingredient (C) in the rubber composition for a rubberized fabrics is an amount giving 1 to 50% by weight of the amount of the filler (B), preferably 2 to 40% by weight. If the amount of the polysiloxane (C) is less than 1% by weight of the amount of the filler (B), the effect of compounding is not obtained, while if more than 50% by weight of the amount of the filler (B) blended, there is the danger of bleed-out from the vulcanizate.

If a silane coupling agent (D) is added to the rubber composition of the present invention in addition to the elastomer (A), filler (B), and polysiloxane (C), as explained with reference to the addition of the polysiloxane (C), even if the amount of the silane coupling agent added is smaller than in the past, it is possible to obtain a sufficient reinforcing effect of the silane coupling agent, which is effective for the improvement of the abrasion resistance and other properties of the vulcanizate. Further, if a silane coupling agent is added to the rubber composition for a conveyor belt cover, a rubber composition superior in abrasion resistance in the vulcanizate can be obtained. Further, if a silane coupling agent is added to the rubber composition for a roll, a rubber composition superior in not only the abrasion resistance in the vulcanizate but also the bondability with iron metal can be obtained. Further, if a silane coupling agent is added to the rubber composition for a hose, a rubber composition not only superior in the abrasion resistance in the vulcanizate, but also improved in modulus can be obtained.

The silane coupling agent added to the rubber composition of the present invention is not particularly limited. Any silane coupling agent used together with silica fillers in the past may be used. As typical examples, those mentioned above may be mentioned. Among these, bis-[3-(triethoxysilyl)-propyl]tetrasulfide is particularly preferred from the viewpoint of the improvement of the processability.

The amount of the silane coupling agent added in the rubber compositions of the present invention is an amount giving 1 to 20% by weight, preferably an amount giving 2 to 10% by weight, of the amount of the filler added to the rubber compositions for the footwear, conveyor belt covers, rolls, hoses, cables, rubberized fabrics, and grips. If less than 1% by weight, the desired effect cannot be obtained, while if more than 20% by weight, scorching easily occurs in the mixing or extrusion process.

The rubber compositions of the present invention may contain, in addition to the elastomer (A), the filler (B), the polysiloxane (C), and the silane coupling agent (D) added when necessary for further improvement of the abrasion resistance and other properties, various types of additives added for various objectives in general rubbers such as carbon black, a vulcanization or cross-linking agent, various oils, antioxidants, plasticizers, antiscorching agents, flame retardants. These additives may be added in the general amounts added in the past for these additives so long as this does not run counter to the object of the present invention.

The rubber compositions of the present invention may be produced by kneading and vulcanizing the elastomer (A), the filler (B), and the polysiloxane (C) and the silane coupling agent (D) added when required for further improving the abrasion resistance and other properties and also the various types of additives to make a composition and then vulcanizing or cross-linking the same.

Further, the present invention provides footwear, conveyor belt covers, rolls, hoses, cables, rubberized fabrics, and grips comprising these rubber composition for footwear, rubber composition for conveyor belt covers, rubber composition for rolls, rubber composition for hoses, rubber composition for cables, rubber composition for rubberized fabrics, and rubber composition for grips. In particular, the footwear of the present invention comprises the above rubber composition for footwear it its soles or entirety. Further, the conveyor belt cover comprises the above rubber composition for a conveyor belt cover. Further, the roll of the present invention has a rubber layer comprising the above rubber composition for a roll. The rubber layer is formed laid over the outer circumference of a core of cast iron, soft iron, or other iron-based metal. The hose of the present invention has an outer surface rubber layer or inner surface rubber layer comprising the above rubber composition for a hose. The cable of the present invention has an outer covering comprising the above rubber composition for a cable. The rubberized fabric of the present invention has a rubber layer comprising the above rubber composition for a rubberized fabric over a fabric substrate. Further, the grip of the present invention has a grip portion comprising the above rubber composition for a grip.

EXAMPLES

The present invention will now be described below in further detail with reference to Examples and Comparative Examples, but the present invention is of course not limited to these Examples.

Synthesis of Polysiloxane

The polysiloxane used in the Examples and Comparative Examples was synthesized according to the following method.

A mixture of 80 g of ethanol and 40 μl of a 1% chloroplatinic acid in isopropyl alcohol solution was slowly dropwise added at 50° C. to 100 g of polymethyl hydrogen siloxane (KF99, made by Shin-Etsu Chemical). After the end of the addition, the mixture was allowed to react at 80° C. for 10 hours. The unreacted ethanol was then removed to obtain the synthesized polysiloxane.

The polysiloxane thus obtained is deduced to have the following structure:

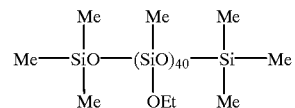

wherein, Me=CH$_3$—, Et=C$_2$H$_5$—.

Further, the following commercially available chemicals were used as the other ingredients used in the Standard Examples, Examples, and Comparative Examples:

Rubber Ingredients

SBR(1): JSR 1778N (containing 23.7% by weight naphthene oil) made by Japan Synthetic Rubber SBR(2): Nipol 1502 made by Nippon Zeon SBR(3): Nipol 1500 made by Nippon Zeon

NR: RSS#1

NBR: N230SL made by Japan Synthetic Rubber

High styrene rubber: 0061 made by Japan Synthetic Rubber

CR: Neoprene WRT made by Showa Denko-Du Pont

EPDM(1): JSR EP33 made by Japan Synthetic Rubber

EPDM(2): JSR EPT4021 made by Japan Synthetic Rubber

Fillers
- Silica (1): Nipsil AQ made by Nippon Silica Industrial
- Silica (2): Tokusil GU made by Tokuyama Silane coupling agent: Si69 (chemical name: bis-[3-(triethoxysilyl)-propyl]tetrasulfide) made by Degussa
- Carbon FEF: Niperon #10 made by Nippon Steel Chemical
- Carbon SRF: Asahi #50 made by Asahi Carbon
- Calcium carbonate: Heavy calcium carbonate
- Surface treated calcium carbonate: Hakuenka CC made by Shiraishi Industry
- Zinc oxide: Zinc White No. 3 made by Seido Chemical Industry
- Titanium oxide: Titanium dioxide
- Magnesium oxide: Kyowamag 150 made by Kyowa Chemical
- Clay (1): Kaolin clay
- Clay (2): Katarupo made by Maruo Calcium Additives
- Naphthene base oil: Coumorex No. 2 made by Nippon Petrochemicals
- Paraffin base oil: Paraffin process oil made by Idemitsu Kosan
- Aromatic oil: Diana process oil made by Idemitsu Kosan
- Wax: Sunnoc made by Ouchi Shinko Chemical Industrial
- Plasticizer DOP: Di-(2-ethylhexyl)phthalate
- Stearic acid: Industrial grade stearic acid
- Sulfur: 5% oil treated sulfur
- Antioxidant 3C: N-phenyl-N'-isopropyl-p-phenylene diamine
- Antioxidant 6C: N-phenyl-N'-(1,3-dimethylbutyl)-p-phenylene diamine
- Antioxidant MBP: 2,2-methylene-bis(4-methyl-6-t-butylphenol
- Vulcanication accelerator DM: Dibenzothiazyl disulfide
- Vulcanization accelerator CZ: N-cyclohexyl-2-benzothiazyl sulfenamide
- Vulcanization accelerator TS: Tetramethyl thiuram monosulfide
- Vulcanization accelerator DOTG: Di-o-tolylguanidine
- Vulcanization accelerator DPG: 1,3-phenyl guanidine
- Vulcanization accelerator 22: 2-mercapto imidazoline
- Vulcanization accelerator M: 2-mercapto benzothiazole
- Vulcanization accelerator TRA: 2-dipentamethylene thiuram tetrasulfide The unvulcanized physical properties (Mooney viscosity and scorching time), vulcanized physical properties (tensile strength at break, elongation at break, tensile strength at 100% elongation), abrasion resistance, flex resistance, and bondability in the following Examples and Comparative Examples were measured or evaluated according to the following methods:

Unvulcanized Physical Properties

1) Mooney viscosity: Measured at 100° C. based on JIS K 6300.

2) Scorching time: Time (minutes) during which viscosity increases 5 points at 125° C. based on JIS K 6300

Vulcanized Physical Properties

Vulcanized rubber obtained by vulcanizing the rubber composition at 140° C. for 15 minutes under pressure was measured for tensile strength at break and elongation at break based on JIS K 6301. Further, the rubber composition for a hose was also measured for the tensile strength at 100% elongation.

Abrasion Resistance

1) The rubber composition for footwear and the rubber composition for cables were measured for the abrasion loss of samples by a Lambourn abrasion tester. The index found by the following formula was found as an indicator of the abrasion resistance:

Index=[(abrasion loss of standard example)/(abrasion loss of sample)]×100  (3)

2) The rubber composition for a conveyor belt cover and the rubber composition for a roll were measured for the abrasion ($mm^3$) of samples vulcanized under pressure at 150° C. for 30 minutes based on DIN 53516. An index of the abrasion resistance was found in accordance with the above formula (3).

3) The rubber composition for a hose was used to prepare a test hose 1 of an inside diameter of 9 mm, in accordance with an ordinary method as shown in FIG. 1, having an inner surface rubber layer 2 comprised of NBR (thickness: 1.8 mm), a knitted reinforcement layer 3 comprised of polyester fiber, and an outer surface rubber layer 4 comprised of the rubber composition for a hose of the present invention (thickness: 1.2 mm). Next, a plurality of these test hoses were placed horizontally and a sharp angle (90 degree) ferrous metal jig was placed over the outer surface rubber layers of the test hoses and moved back and forth while applying the same constant load (2.0 kgf/hose) to each of the hoses 1. The amount of abrasion per 4 hours was measured and the index of abrasion resistance found according to the above formula (3).

4) The rubber composition for a rubberized fabrics and the rubber composition for a grip were measured for the abrasion loss of samples by an Akron type tester and the index of the abrasion resistance found according to the above formula (3).

Flex Resistance

A flex test was performed according to JIS K 6301. The length of the cracks occurring in the test piece after 400,000 flexings was measured and used as an index of the flex resistance.

Adhesive Properties

The peeling force when peeling a rubber piece vulcanized and bonded to an iron plate in a 90° direction was measured as the indicator of the bondability according to JIS K 6301.

Examples 1 to 3, Comparative Example 1 (Standard Example), and Comparative Examples 2 to 3

In these Examples, the ingredients of the formulations shown in Table 1 except for the vulcanization accelerator and the sulfur were charged into a 1.8 liter capacity internal mixer and kneaded for 3 to 5 minutes. The mixture was discharged when reaching a temperature of 120±5° C. The vulcanization accelerator and sulfur shown in Table 1 were kneaded with this master batch by an 8 inch open roll to obtain the rubber composition for footwear. The unvulcanized physical properties of the rubber composition for footwear thus obtained were measured.

Then, the rubber composition for footwear was placed in a 15×15×0.2 cm mold and press vulcanized at 140° C. for 15 minutes to prepare a test piece (rubber sheet) which was used for measurement or evaluation of the vulcanized physical properties and abrasion resistance. The results are shown in Table 1.

TABLE 1

| | Stand. Ex. 1 (Comp. Ex. 1) | Ex. 1 | Ex. 2 | Ex. 3 | Comp. Ex. 2 | Comp. Ex. 3 |
|---|---|---|---|---|---|---|
| Formulation (parts by weight) | | | | | | |
| SBR (1) | 137.5 | 137.5 | 137.5 | 137.5 | 137.5 | 137.5 |
| Zinc oxide | 3 | 3 | 3 | 3 | 3 | 3 |
| Stearic acid | 1 | 1 | 1 | 1 | 1 | 1 |
| Silica (1) | 60 | 60 | 60 | 60 | 60 | 60 |
| Coumarone resin | 5 | 5 | 5 | 5 | 5 | 5 |
| Polysiloxane | — | 3 | 3 | 6 | — | — |
| Silane coupling agent | — | — | 3 | 3 | 3 | 6 |
| Naphthene base oil | 5 | 5 | 5 | 5 | 5 | 5 |
| Wax | 1 | 1 | 1 | 1 | 1 | 1 |
| Sulfur | 2 | 2 | 2 | 2 | 2 | 2 |
| Vulcanization accelerator DM | 2 | 2 | 2 | 2 | 2 | 2 |
| Vulcanization accelerator TS | 0.3 | 0.3 | 0.3 | 0.3 | 0.3 | 0.3 |
| Unvulcanized physical properties | | | | | | |
| Mooney viscosity $ML_{1+4}$ | 70 | 61 | 60 | 56 | 65 | 60 |
| Scorch time t5 | 15.3 | 15.6 | 16.0 | 16.1 | 14.5 | 15.5 |
| Vulcanized physical properties | | | | | | |
| Tensile strength at break (MPa) | 15.4 | 17.8 | 18.1 | 19.0 | 17.8 | 18.5 |
| Elongation at break (%) | 730 | 600 | 590 | 565 | 600 | 580 |
| Abrasion resistance Index | 100 | 105 | 114 | 128 | 102 | 105 |

Examples 4 and 5, Comparative Example 4 (Standard Example 2), and Comparative Example 5

In the Examples, the same procedure was followed as in Example 1 except for use of the formulations shown in Table 2 to prepare rubber compositions for footwear. The unvulcanized physical properties, vulcanized physical properties (vulcanization temperature: 140° C., vulcanization time: 15 minutes), and abrasion resistance were measured or evaluated. The results are shown in Table 2:

TABLE 2

| | Ex. 4 | Ex. 5 | Stand. Ex. 2 (Comp. Ex. 4) |
|---|---|---|---|
| Formulation (parts by weight) | | | |
| NBR | 65 | 65 | 65 |
| SBR (2) | 25 | 25 | 25 |
| High styrene rubber | 10 | 10 | 10 |
| Stearic acid | 1 | 1 | 1 |
| Silica (1) | 45 | 45 | 45 |
| Polysiloxane | 3 | 3 | — |
| Silane coupling agent | 0 | 3 | — |
| Calcium carbonate | 20 | 20 | 20 |
| Titanium oxide | 2 | 2 | 2 |
| Sulfur | 2 | 2 | 2 |
| Vulcanization accelerator DM | 2 | 2 | 2 |
| Vulcanization accelerator TS | 0.3 | 0.3 | 0.3 |
| Unvulcanized physical properties | | | |
| Mooney viscosity $ML_{1+4}$ | 65 | 63 | 78 |
| Scorch time t5 | 14.2 | 15.5 | 12.3 |
| Vulcanized physical properties | | | |
| Tensile strength at break (MPa) | 17.5 | 18.9 | 16.1 |
| Elongation at break (%) | 580 | 575 | 600 |
| Abrasion resistance Index | 110 | 122 | 100 |

Examples 6 and 7, Standard Example 3 (Comparative Example 5), and Comparative Examples 6 and 7

In the Examples, the same procedure was followed as in Example 1 except for use of the formulations shown in Table 3 to prepare rubber compositions and obtain rubber compositions for conveyor belt covers. The unvulcanized physical properties, vulcanized physical properties (vulcanization temperature: 150° C., vulcanization time: 30 minutes), and abrasion resistance were measured or evaluated for the rubber compositions for conveyor belt covers obtained. The results are shown in Table 3:

TABLE 3

| | Stand. Ex. 3 (Comp. Ex. 5) | Ex. 6 | Ex. 7 | Comp. Ex. 6 | Comp. Ex. 7 |
|---|---|---|---|---|---|
| Formulation (parts by weight) | | | | | |
| NR | 50 | 50 | 50 | 50 | 50 |
| SBR (3) | 50 | 50 | 50 | 50 | 50 |
| Zinc oxide | 3 | 3 | 3 | 3 | 3 |
| Stearic acid | 1 | 1 | 1 | 1 | 1 |
| Silica (1) | 30 | 30 | 30 | 30 | 30 |
| Polysiloxane | — | 1.5 | 1.5 | — | — |
| Silane coupling agent | — | — | 1.5 | 1.5 | 3 |
| Naphthene oil | 10 | 10 | 10 | 10 | 10 |
| Calcium carbonate | 45 | 45 | 45 | 45 | 45 |
| Sulfur | 2 | 2 | 2 | 2 | 2 |
| Vulcanization accelerator CZ | 1 | 1 | 1 | 1 | 1 |
| Vulcanization accelerator TS | 0.2 | 0.2 | 0.2 | 0.2 | 0.2 |
| Unvulcanized physical properties | | | | | |
| Mooney viscosity $ML_{1+4}$ | 55 | 44 | 42 | 47 | 43 |
| Scorch time t5 | 34 | 36 | 36 | 35 | 36 |
| Vulcanized physical properties | | | | | |
| Tensile strength at break (MPa) | 15.5 | 17.0 | 18.1 | 16.5 | 18.5 |
| Elongation at break (%) | 630 | 580 | 560 | 570 | 555 |
| Abrasion resistance Index | 100 | 104 | 119 | 102 | 105 |
| Flexural test Crack length (mm) | 5 | 6 | 10 | 11 | 18 |

Examples 8 and 9 and Standard Example 4 (Comparative Example 6)

In the Examples, the same procedure was followed as in Example 1 except for use of the formulations shown in Table 4 to prepare rubber compositions and obtain rubber compositions for conveyor belt covers. The unvulcanized physical properties, vulcanized physical properties (vulcanization temperature: 150° C., vulcanization time: 30 minutes), and abrasion resistance were measured or evaluated for the rubber compositions for conveyor belt covers obtained. The results are shown in Table 4:

TABLE 4

| Formulation (parts by weight) | Stand. Ex. 4 (Comp. Ex. 6) | Ex. 8 | Ex. 9 |
|---|---|---|---|
| NR | 60 | 60 | 60 |
| SBR (2) | 40 | 40 | 40 |
| Zinc oxide | 3 | 3 | 3 |
| Stearic acid | 1 | 1 | 1 |
| Carbon FEF | 30 | 30 | 30 |
| Polysiloxane | — | 2 | 4 |
| Silane coupling agent | — | 2 | 2 |
| Calcium carbonate | 170 | 170 | 170 |
| Aromatic oil | 10 | 10 | 10 |
| Sulfur | 2.5 | 2.5 | 2.5 |
| Vulcanization accelerator CZ | 1 | 1 | 1 |
| Vulcanization accelerator TS | 0.2 | 0.2 | 0.2 |
| Unvulcanized physical properties | | | |
| Mooney viscosity $ML_{1+4}$ | 65 | 60 | 57 |
| Scorch time t5 | 16.4 | 18.1 | 18.5 |
| Vulcanized physical properties | | | |
| Tensile strength at break (MPa) | 7.6 | 9.0 | 9.5 |
| Elongation at break (%) | 470 | 450 | 440 |
| Abrasion resistance Index | 100 | 108 | 120 |

Examples 10 and 11, Standard Example 5 (Comparative Example 7), and Comparative Examples 8 and 9

In the Examples, the same procedure was followed as in Example 1 except for use of the formulations shown in Table 5 to prepare rubber compositions and obtain rubber compositions for rolls. The unvulcanized physical properties, vulcanized physical properties (vulcanization temperature: 150° C., vulcanization time: 30 minutes), and abrasion resistance were measured or evaluated for the rubber compositions for rolls obtained. The results are shown in Table 5:

TABLE 5

| | Stand. Ex. 5 (Comp. Ex. 7) | Ex. 10 | Ex. 11 | Comp. Ex. 8 | Comp. Ex. 9 |
|---|---|---|---|---|---|
| Formulation (parts by weight) | | | | | |
| CR | 100 | 100 | 100 | 100 | 100 |
| Magnesium oxide | 4 | 4 | 4 | 4 | 4 |
| Stearic acid | 2 | 2 | 2 | 2 | 2 |
| Silica (2) | 30 | 30 | 30 | 30 | 30 |
| Polysiloxane | — | 1.5 | 1.5 | — | — |
| Silane coupling agent | — | — | 1.5 | 1.5 | 3 |
| Calcium carbonate | 20 | 20 | 20 | 20 | 20 |
| Titanium oxide | 5 | 5 | 5 | 5 | 5 |
| Naphthene oil | 5 | 5 | 5 | 5 | 5 |
| Zinc oxide | 5 | 5 | 5 | 5 | 5 |
| Sulfur | 1 | 1 | 1 | 1 | 1 |
| Vulcanization accelerator DOTG | 0.5 | 0.5 | 0.5 | 0.5 | 0.5 |
| Vulcanization accelerator TS | 1 | 1 | 1 | 1 | 1 |
| Unvulcanized physical properties | | | | | |
| Mooney viscosity $ML_{1+4}$ | 55 | 51 | 52 | 54 | 51 |
| Scorch time t5 | 18.1 | 18.7 | 18.2 | 17.8 | 18.0 |

TABLE 5-continued

| | Stand. Ex. 5 (Comp. Ex. 7) | Ex. 10 | Ex. 11 | Comp. Ex. 8 | Comp. Ex. 9 |
|---|---|---|---|---|---|
| Vulcanized physical properties | | | | | |
| Tensile strength at break (MPa) | 16.0 | 17.1 | 17.5 | 16.5 | 17.2 |
| Elongation at break (%) | 960 | 930 | 923 | 954 | 940 |
| Abrasion resistance Index | 100 | 111 | 119 | 103 | 107 |
| Adhesive Properties Peeling force (N/15 mm) | 130 | 143 | 162 | 141 | 145 |

Standard Example 6 (Comparative Example 10) and Examples 12 and 13

In the Examples, the same procedure was followed as in Example 1 except for use of the formulations shown in Table 6 to prepare rubber compositions and obtain rubber compositions for rolls. The unvulcanized physical properties, vulcanized physical properties (vulcanization temperature: 150° C., vulcanization time: 30 minutes), and abrasion resistance were measured or evaluated for the obtained rubber compositions for rolls. The results are shown in Table 6:

TABLE 6

| | Stand. Ex. 6 (Comp. Ex. 10) | Ex. 12 | Ex. 13 |
|---|---|---|---|
| Formulation (parts by weight) | | | |
| SBR (2) | 60 | 60 | 60 |
| NR | 40 | 40 | 40 |
| Zinc oxide | 3 | 3 | 3 |
| Stearic acid | 1 | 1 | 1 |
| Silica (1) | 30 | 30 | 30 |
| Polysilxane | — | 1.5 | 3 |
| Silane coupling agent | — | 1.5 | 1.5 |
| Calcium carbonate | 50 | 50 | 50 |
| Paraffin oil | 10 | 10 | 10 |
| Sulfur | 2 | 2 | 2 |
| Vulcanization accelerator CZ | 1 | 1 | 1 |
| Vulcanization accelerator TS | 0.2 | 0.2 | 0.2 |
| Unvulcanized physical properties | | | |
| Mooney viscosity $ML_{1+4}$ | 60 | 57 | 52 |
| Scorch time t5 | 13.2 | 16.2 | 16.4 |
| Vulcanized physical properties | | | |
| Tensile strength at break (MPa) | 14.6 | 16.3 | 16.9 |
| Elongation at break (%) | 660 | 650 | 645 |
| Abrasion resistance Index | 100 | 115 | 126 |
| Adhesive Properties Peeling force (N/15 mm) | 165 | 190 | 200 |

Standard Example 7 (Comparative Example 11), Examples 14 and 15, and Comparative Examples 12 and 13

In the Examples, the same procedure was followed as in Example 1 except for use of the formulations shown in Table 7 to prepare rubber compositions and obtain rubber compositions for hoses. The unvulcanized physical properties, vulcanized physical properties (vulcanization temperature: 150° C., vulcanization time: 30 minutes), and abrasion resistance were measured or evaluated for the rubber compositions for hoses obtained. The results are shown in Table

7:

TABLE 7

|  | Stand. Ex. 7 (Comp. Ex. 11) | Ex. 14 | Ex. 15 | Comp. Ex. 12 | Comp. Ex. 13 |
|---|---|---|---|---|---|
| Formulation (parts by weight) | | | | | |
| NR | 50 | 50 | 50 | 50 | 50 |
| SBR (3) | 50 | 50 | 50 | 50 | 50 |
| Zinc oxide | 3 | 3 | 3 | 3 | 3 |
| Stearic acid | 1 | 1 | 1 | 1 | 1 |
| Silica (1) | 20 | 20 | 20 | 20 | 20 |
| Polysiloxane | — | 1 | 1 | — | — |
| Silane coupling agent | — | — | 1 | 1 | 2 |
| Plasticizer DOP | 10 | 10 | 10 | 10 | 10 |
| Surface treated calcium carbonate | 60 | 60 | 60 | 60 | 60 |
| Titanium dioxide | 10 | 10 | 10 | 10 | 10 |
| Sulfur | 2 | 2 | 2 | 2 | 2 |
| Vulcanization accelerator DM | 1 | 1 | 1 | 1 | 1 |
| Unvulcanized physical properties | | | | | |
| Mooney viscosity $ML_{1+4}$ | 55 | 47 | 46 | 49 | 48 |
| Scorch time t5 | 32.8 | 32.7 | 33.2 | 33.5 | 33.4 |
| Vulcanized physical properties | | | | | |
| Tensile strength at 100% elongation (MPa) | 2.5 | 2.9 | 3.6 | 3.2 | 3.4 |
| Tensile strength at break (MPa) | 12.2 | 13.2 | 13.9 | 12.5 | 12.9 |
| Elongation at break (%) | 640 | 632 | 629 | 650 | 645 |
| Abrasion resistance Index | 100 | 107 | 118 | 103 | 107 |

Standard Example 8 (Comparative Example 14) and Examples 16 and 17

In the Examples, the same procedure was followed as in Example 1 except for use of the formulations shown in Table 8 to prepare rubber compositions and obtain rubber compositions for hoses. The unvulcanized physical properties, vulcanized physical properties (vulcanization temperature: 150° C., vulcanization time: 30 minutes), and abrasion resistance were measured or evaluated for the rubber compositions for hoses obtained. The results are shown in Table 8:

TABLE 8

|  | Stand. Ex. 8 (Comp. Ex. 14) | Ex. 16 | Ex. 17 |
|---|---|---|---|
| Formulation (parts by weight) | | | |
| CR | 80 | 80 | 80 |
| SBR (2) | 20 | 20 | 20 |
| Magnesium oxide | 4 | 4 | 4 |
| Stearic acid | 1 | 1 | 1 |
| Polysiloxane | — | 2 | 5 |
| Silane coulpling agent | — | 2 | 2 |
| Carbon FEF | 120 | 120 | 120 |
| Calcium carbonate | 50 | 50 | 50 |
| Antioxidant 3C | 2 | 2 | 2 |
| Naphthene oil | 30 | 30 | 30 |
| Zinc oxide | 5 | 5 | 5 |
| Sulfur | 0.5 | 0.5 | 0.5 |
| Vulcanization accelerator DPG | 0.75 | 0.75 | 0.75 |

TABLE 8-continued

|  | Stand. Ex. 8 (Comp. Ex. 14) | Ex. 16 | Ex. 17 |
|---|---|---|---|
| Vulcanization accelerator TS | 1.0 | 1.0 | 1.0 |
| Unvulcanized physical properties | | | |
| Mooney viscosity $ML_{1+4}$ | 55 | 50 | 48 |
| Scorch time t5 | 17.5 | 18.1 | 18.3 |
| Vulcanized physical properties | | | |
| Tensile strength at 100% elongation (MPa) | 5.2 | 6.5 | 6.8 |
| Tensile strength at break (MPa) | 9.9 | 10.6 | 10.2 |
| Elongation at break (%) | 200 | 190 | 185 |
| Abrasion resistance Index | 100 | 107 | 125 |

Standard Example 9 (Comparative Example 15), Examples 18 and 19, and Comparative Examples 16–19

In the Examples, the same procedure was followed as in Example 1 except for use of the formulations shown in Table 9 to prepare rubber compositions and obtain rubber compositions for cables. The unvulcanized physical properties, vulcanized physical properties (vulcanization temperature: 150° C., vulcanization time: 30 minutes), and abrasion resistance were measured or evaluated for the rubber compositions for cables obtained. The results are shown in Table 9:

TABLE 9

|  | Stand. Ex. 9 (Comp. Ex. 15) | Ex. 18 | Ex. 19 | Comp. Ex. 16 | Comp. Ex. 19 |
|---|---|---|---|---|---|
| Formulation (parts by weight) | | | | | |
| NR | 100 | 100 | 100 | 100 | 100 |
| Zinc oxide | 10 | 10 | 10 | 10 | 10 |
| Stearic acid | 1 | 1 | 1 | 1 | 1 |
| Silica (1) | 40 | 40 | 40 | 40 | 40 |
| Polysiloxane | — | 2 | 2 | — | — |
| Silane coupling agent | — | — | 2 | 2 | 4 |
| Antioxidant 6C | 1 | 1 | 1 | 1 | 1 |
| Calcium carbonate | 110 | 110 | 110 | 110 | 110 |
| Aromatic oil | 3 | 3 | 3 | 3 | 3 |
| Sulfur | 2 | 2 | 2 | 2 | 2 |
| Vulcanization accelerator DM | 1 | 1 | 1 | 1 | 1 |
| Unvulcanized physical properties | | | | | |
| Mooney viscosity $ML_{1+4}$ | 43 | 35 | 34 | 38 | 36 |
| Scorch time t5 | 21.0 | 21.2 | 21.6 | 21.4 | 22.0 |
| Vulcanized physical properties | | | | | |
| Tensile strength at break (MPa) | 12.2 | 13.2 | 13.8 | 12.4 | 12.5 |
| Elongation at break (%) | 640 | 631 | 629 | 637 | 625 |
| Abrasion resistance Index | 100 | 107 | 113 | 101 | 104 |

Standard Example 10 (Comparative Example 19) and Examples 20 and 21

In the Examples, the same procedure was followed as in Example 1 except for use of the formulations shown in Table 10 to prepare rubber compositions and obtain rubber compositions for cables. The unvulcanized physical properties, vulcanized physical properties (vulcanization temperature: 150° C., vulcanization time: 30 minutes), and abrasion resistance were measured or evaluated for the rubber compositions for cables obtained. The results are shown in Table 10:

TABLE 10

|  | Stand. Ex. 10 (Comp. Ex. 19) | Ex. 20 | Ex. 21 |
|---|---|---|---|
| Formulation (parts by weight) | | | |
| CR | 100 | 100 | 100 |
| Magnesium oxide | 4 | 4 | 4 |
| Stearic acid | 1 | 1 | 1 |
| Silica (1) | 20 | 20 | 20 |
| Polysilxane | — | 2.5 | 5 |
| Silane coupling agent | — | 2 | 2 |
| Carbon SRF | 20 | 20 | 20 |
| Clay (1) | 10 | 10 | 10 |
| Naphthene oil | 5 | 5 | 5 |
| Zinc oxide | 10 | 10 | 10 |
| Vulcanization accelerator 22 | 0.5 | 0.5 | 0.5 |
| Vulcanization accelerator DPG | 0.2 | 0.2 | 0.2 |
| Unvulcanized physical properties | | | |
| Mooney viscosity $ML_{1+4}$ | 41 | 38 | 36 |
| Scorch time t5 | 12.3 | 13.1 | 13.3 |
| Vulcanized physical properties | | | |
| Tensile strength at break (MPa) | 19.0 | 21.2 | 20.5 |
| Elongation at break (%) | 450 | 435 | 440 |
| Abrasion resistance Index | 100 | 107 | 120 |

Standard Example 11 (Comparative Example 20), Examples 22 and 23, and Comparative Examples 21 and 22

In the Examples, the same procedure was followed as in Example 1 except for use of the formulations shown in Table 11 to prepare rubber compositions and obtain rubber compositions for rubberized fabrics. The unvulcanized physical properties, vulcanized physical properties (vulcanization temperature: 140° C., vulcanization time: 15 minutes), and abrasion resistance were measured or evaluated for the rubber compositions for rubberized fabrics obtained. The results are shown in Table 11:

TABLE 11

|  | Stand. Ex. 11 (Comp. Ex. 20) | Ex. 22 | Ex. 23 | Comp. Ex. 21 | Comp. Ex. 22 |
|---|---|---|---|---|---|
| Formulation (parts by weight) | | | | | |
| SBR (3) | 65 | 65 | 65 | 65 | 65 |
| EPDM (1) | 35 | 35 | 35 | 35 | 35 |
| Zinc oxide | 4 | 4 | 4 | 4 | 4 |
| Stearic acid | 1 | 1 | 1 | 1 | 1 |
| Silica (1) | 20 | 20 | 20 | 20 | 20 |
| Polysiloxane | — | 1 | 1 | — | — |
| Silane coupling agent | — | — | 1 | 1 | 2 |
| Surface treated calcium carbonate | 30 | 30 | 30 | 30 | 30 |
| Clay (2) | 55 | 55 | 55 | 55 | 55 |
| Naphthene oil | 15 | 15 | 15 | 15 | 15 |
| Sulfur | 2.2 | 2.2 | 2.2 | 2.2 | 2.2 |
| Vulcanization accelerator DM | 0.7 | 0.7 | 0.7 | 0.7 | 0.7 |
| Vulcanization accelerator M | 0.5 | 0.5 | 0.5 | 0.5 | 0.5 |
| Vulcanization accelerator TS | 0.3 | 0.3 | 0.3 | 0.3 | 0.3 |

TABLE 11-continued

|  | Stand. Ex. 11 (Comp. Ex. 20) | Ex. 22 | Ex. 23 | Comp. Ex. 21 | Comp. Ex. 22 |
|---|---|---|---|---|---|
| Unvulcanized physical properties | | | | | |
| Mooney viscosity $ML_{1+4}$ | 38 | 32 | 30 | 34 | 32 |
| Scorch time t5 | 11.5 | 12.1 | 12.3 | 12.0 | 12.1 |
| Vulcanized physical properties | | | | | |
| Tensile strength at break (MPa) | 8.5 | 10.1 | 10.3 | 9.9 | 10.5 |
| Elongation at break (%) | 660 | 649 | 640 | 659 | 666 |
| Abrasion resistance Index | 100 | 105 | 114 | 102 | 105 |

Standard Example 12 (Comparative Example 23), Examples 24 and 25, and Comparative Examples 24 and 25

In the Examples, the same procedure was followed as in Example 1 except for use of the formulations shown in Table 12 to prepare rubber compositions and obtain rubber compositions for rubberized fabrics. The unvulcanized physical properties, vulcanized physical properties (vulcanization temperature: 160° C., vulcanization time: 15 minutes), and abrasion resistance were measured or evaluated for the rubber compositions for rubberized fabrics obtained. The results are shown in Table 12:

TABLE 12

|  | Stand. Ex. 12 (Comp. Ex. 23) | Ex. 24 | Ex. 25 | Comp. Ex. 24 | Comp. Ex. 25 |
|---|---|---|---|---|---|
| Formulation (parts by weight) | | | | | |
| EPDM (2) | 100 | 100 | 100 | 100 | 100 |
| Zinc oxide | 3 | 3 | 3 | 3 | 3 |
| Stearic acid | 1 | 1 | 1 | 1 | 1 |
| Silica (2) | 40 | 40 | 40 | 40 | 40 |
| Polysiloxane | — | 1.5 | 1.5 | — | — |
| Silane coupling agent | — | — | 1.5 | 1.5 | 3 |
| Antioxidant MBP | 1 | 1 | 1 | 1 | 1 |
| Paraffin oil | 5 | 5 | 5 | 5 | 5 |
| Sulfur | 1 | 1 | 1 | 1 | 1 |
| Vulcanization accelerator CZ | 1.5 | 1.5 | 1.5 | 1.5 | 1.5 |
| Vulcanization accelerator M | 1.5 | 1.5 | 1.5 | 1.5 | 1.5 |
| Vulcanization accelerator TRA | 0.5 | 0.5 | 0.5 | 0.5 | 0.5 |
| Vulcanization accelerator TS | 0.5 | 0.5 | 0.5 | 0.5 | 0.5 |
| Unvulcanized physical properties | | | | | |
| Mooney viscosity $ML_{1+4}$ | 40 | 35 | 35 | 34 | 37 |
| Scorch time t5 | 13.9 | 13.1 | 13.6 | 12.0 | 12.0 |
| Vulcanized physical properties | | | | | |
| Tensile strength at break (MPa) | 9.0 | 10.1 | 11.6 | 9.9 | 11.7 |
| Elongation at break (%) | 864 | 649 | 748 | 659 | 704 |

TABLE 12-continued

| | Stand. Ex. 12 (Comp. Ex. 23) | Ex. 24 | Ex. 25 | Comp. Ex. 24 | Comp. Ex. 25 |
|---|---|---|---|---|---|
| Abrasion resistance Index | 100 | 106 | 115 | 102 | 105 |

INDUSTRIAL APPLICABILITY

The rubber compositions of the present invention can give rubber compositions which are superior in the processability in the unvulcanized state and have the various properties sought for individual applications. For example, the rubber composition for footwear is superior in processability in the unvulcanized state and can give a vulcanizate which is superior in abrasion resistance through the addition of a silane coupling agent.

Further, the rubber composition for a conveyor belt cover is superior in processability in the unvulcanized state and can give a vulcanizate which is superior in abrasion resistance through the addition of a silane coupling agent. Further, it can give a vulcanizate which is superior in abrasion resistance and crack resistance by half of the polysiloxane compared with when adding a silane coupling agent alone.

The rubber composition for a roll is superior in processability in the unvulcanized state and can give a vulcanizate which is superior in abrasion resistance and bondability with an iron metal through the addition of a silane coupling agent.

The rubber composition for a hose is superior in processability in the unvulcanized state and can give a vulcanizate which is superior in modulus and abrasion resistance through the addition of a silane coupling agent.

The rubber composition for a cable is superior in processability in the unvulcanized state and can give a vulcanizate which is superior in abrasion resistance through the addition of a silane coupling agent.

The rubber composition for rubberized fabric is superior in processability in the unvulcanized state and can give a vulcanizate which is superior in abrasion resistance through the addition of a silane coupling agent.

The rubber composition for a grip is superior in processability in the unvulcanized state and can give a vulcanizate which is superior in abrasion resistance through the addition of a silane coupling agent.

Further, the footwear, conveyor belt covers, rolls, hoses, cables, rubberized fabrics, and grips of the present invention are comprised of the above rubber compositions in part or whole, are superior in processability when worked, and are superior in the abrasion resistance and other properties depending upon their applications.

What is claimed is:

1. A rubber composition for footwear comprising (A) 100 parts by weight of an elastomer selected from the group consisting of natural rubber (NR), polyisoprene rubber (IR), polychloroprene rubber (CR), styrene-butadiene copolymer rubber (SBR), polybutadiene rubber (BR), acrylonitrile-butadiene copolymer rubber (NBR), butyl rubber (IIR) and ethylene-propylene copolymer rubbers (EPM, EPDM), (B) 5 to 150 parts by weight of a filler, and (C) 1 to 100 parts by weight, based upon 100 parts by weight of the filler (B), of a polysiloxane represented by the formula (I) having an average degree of polymerization of 3 to 1000:

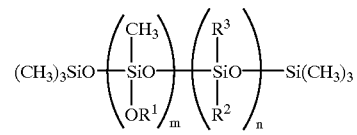
(I)

wherein $R^1$ is a $C_1$ to $C_{18}$ substituted or unsubstituted monovalent hydrocarbon group which may contain an ether bond, $R^2$ is a hydrogen atom or a $C_1$ to $C_{18}$ substituted or unsubstituted monovalent hydrocarbon group, $R^3$ is a methyl group or phenyl group, m is an integer of 1 or more, and n is 0 or a positive integer.

2. A rubber composition as claimed in claim 1, further comprising (D) a silane coupling agent in an amount of 1 to 20% by weight of the amount of the filler (B).

3. Footwear comprising the rubber composition according to claim 1 or 2.

4. A rubber composition for a cover of a conveyor belt comprising (A) 100 parts by weight of an elastomer selected from the group consisting of natural rubber (NR), polyisoprene rubber (IR), polychloroprene rubber (CR), styrene-butadiene copolymer rubber (SBR), polybutadiene rubber (BR), acrylonitrile-butadiene copolymer rubber (NBR), butyl rubber (IIR) and ethylene-propylene copolymer rubbers (EPM, EPDM), (B) 5 to 150 parts by weight of a filler, and (C) 1 to 50 parts by weight, based upon 100 parts by weight of the filler (B), of a polysiloxane represented by the formula (I) having an average degree of polymerization of 3 to 1000:

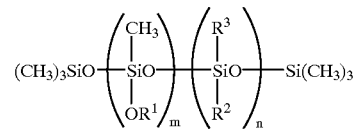
(I)

wherein $R^1$ is a $C_1$ to $C_{18}$ substituted or unsubstituted monovalent hydrocarbon group which may contain an ether bond, $R^2$ is a hydrogen atom or a $C_1$ to $C_{18}$ substituted or unsubstituted monovalent hydrocarbon group, $R^3$ is a methyl group or phenyl group, m is an integer of 1 or more, and n is 0 or a positive integer.

5. A rubber composition as claimed in claim 1, further comprising (D) a silane coupling agent in an amount of 1 to 20% by weight of the amount of the filler (B).

6. A conveyor belt cover comprising the rubber composition according to claim 4 or 5.

7. A rubber composition for a roll comprising (A) 100 parts by weight of an elastomer selected from the group consisting of natural rubber (NR), polyisoprene rubber (IR), polychloroprene rubber, (CR), styrene-butadiene copolymer rubber (SBR), polybutadiene rubber (BR), acrylonitrile-butadiene copolymer rubber (NBR), butyl rubber (IIR) and ethylene-propylene copolymer rubbers (EPM, EPDM), (B) 5 to 150 parts by weight of a filler, and (C) 1 to 100 parts by weight, based upon 100 parts by weight of the filler (B), of a polysiloxane represented by the formula (I) having an average degree of polymerization of 3 to 1000:

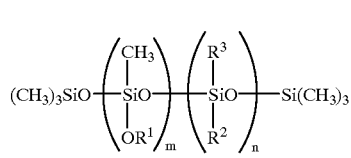

(I)

wherein, $R^1$ is a $C_1$ to $C_{18}$ substituted or unsubstituted monovalent hydrocarbon group which may contain an ether bond, $R^2$ is a hydrogen atom or a $C_1$ to $C_{18}$ substituted or unsubstituted monovalent hydrocarbon group, $R^3$ is a methyl group or phenyl group, m is an integer of 1 or more, and n is 0 or a positive integer.

8. A rubber composition as claimed in claim 7, further comprising (D) a silane coupling agent in an amount of 1 to 20% by weight of the amount of the filler (B).

9. A roll comprising the rubber composition according to claim 7 or 8.

10. A rubber composition for a hose comprising (A) 100 parts by weight of an elastomer selected from the group consisting of natural rubber (NR), polyisoprene rubber (IR), polychloroprene rubber, (CR), styrene-butadiene copolymer rubber (SBR), polybutadiene rubber (BR), acrylonitrile-butadiene copolymer rubber (NBR), butyl rubber (IIR) and ethylene-propylene copolymer rubbers (EPM, EPDM), (B) 5 to 200 parts by weight of a filler, and (C) 1 to 40 parts by weight, based upon 100 parts by weight of the filler (B), of a polysiloxane represented by the formula (I) having an average degree of polymerization of 3 to 1000:

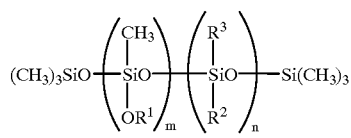

(I)

wherein, $R^1$ is a $C_1$ to $C_{18}$ substituted or unsubstituted monovalent hydrocarbon group which may contain an ether bond, $R^2$ is a hydrogen atom or a $C_1$ to $C_{18}$ substituted or unsubstituted monovalent hydrocarbon group, $R^3$ is a methyl group or phenyl group, m is an integer of 1 or more, and n is 0 or a positive integer.

11. A rubber composition for a hose as claimed in claim 10, further comprising (D) a silane coupling agent in an amount of 1 to 20% by weight of the amount of the filler (B).

12. A hose having a rubber layer comprising the rubber composition according to claim 10 or 11.

13. A rubber composition for a cable comprising (A) 100 parts by weight of an elastomer selected from the group consisting of natural rubber (NR), polyisoprene rubber (IR), polychloroprene rubber (CR), styrene-butadiene copolymer rubber (SBR), polybutadiene rubber (BR), acrylonitrile-butadiene copolymer rubber (NBR), butyl rubber (IIR) and ethylene-propylene copolymer rubbers (EPM, EPDM), (B) 5 to 150 parts by weight of a filler, and (C) 1 to 40 parts by weight, based upon 100 parts by weight of the filler (B), of a polysiloxane represented by the formula (I) having an average degree of polymerization of 3 to 1000:

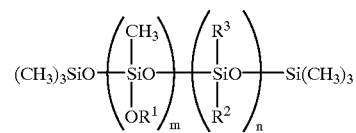

(I)

wherein $R^1$ is a $C_1$ to $C_{18}$ substituted or unsubstituted monovalent hydrocarbon group which may contain an ether bond, $R^2$ is a hydrogen atom or a $C_1$ to $C_{18}$ substituted or unsubstituted monovalent hydrocarbon group, $R^3$ is a methyl group or phenyl group, m is an integer of 1 or more, and n is 0 or a positive integer.

14. A rubber composition as claimed in claim 13, further comprising (D) a silane coupling agent in an amount of 1 to 20% by weight of the amount of the filler (B).

15. A cable having a rubber layer comprising the rubber composition according to claim 13 or 14.

16. A rubber composition for a rubberized fabric comprising (A) 100 parts by weight of an elastomer selected from the group consisting of natural rubber (NR), polyisoprene rubber (IR), polychloroprene rubber (CR), styrene-butadiene copolymer rubber (SBR), polybutadiene rubber (BR), acrylonitrile-butadiene copolymer rubber (NBR), butyl rubber (IIR) and ethylene-propylene copolymer rubbers (EPM, EPDM), (B) 5 to 250 parts by weight of a filler, and (C) 1 to 100 part by weight, based upon 100 part by weight of the filler (B), of a polysiloxane represented by the formula (I) having an average degree of polymerization of 3 to 1000:

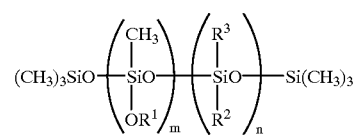

(I)

wherein $R^1$ is a $C_1$ to $C_{18}$ substituted or unsubstituted monovalent hydrocarbon group which may contain an ether bond, $R^2$ is a hydrogen atom or a $C_1$ to $C_{18}$ substituted or unsubstituted monovalent hydrocarbon group, $R^3$ is a methyl group or phenyl group, m is an integer of 1 or more, and n is 0 or a positive integer.

17. A rubber composition as claimed in claim 16, further comprising (D) a silane coupling agent in an amount of 1 to 20% by weight of the amount of the filler (B).

18. A rubberized fabric having a rubber layer comprising the rubber composition according to claim 16 or 17.

19. A rubber composition for a grip comprising (A) 100 parts by weight of an elastomer selected from the group consisting of natural rubber (NR), polyisoprene rubber (IR), polychloroprene rubber (CR), styrene-butadiene copolymer rubber (SBR), polybutadiene rubber (BR), acrylonitrile-butadiene copolymer rubber (NBR), butyl rubber (IIR) and ethylene-propylene copolymer rubbers (EPM, EPDM), (B) 5 to 250 parts by weight of a filler, and (C) 1 to 100 parts by weight, based upon 100 parts by weight of the filler (B), of a polysiloxane represented by the formula (I) having an average degree of polymerization of 3 to 1000:

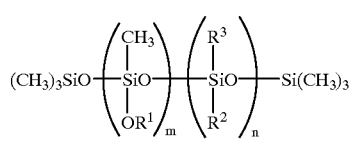 (I)

wherein, $R^1$ is a $C_1$ to $C_{18}$ substituted or unsubstituted monovalent hydrocarbon group which may contain an ether bond, $R^2$ is a hydrogen atom or a $C_1$ to $C_{18}$ substituted or unsubstituted monovalent hydrocarbon group, $R^3$ is a methyl group or phenyl group, m is an integer of 1 or more, and n is 0 or a positive integer.

20. A rubber composition for a grip as claimed in claim 19, further comprising (D) a silane coupling agent in an amount of 1 to 20% by weight of the amount of the filler (B).

21. A grip having a rubber layer comprising the rubber composition according to claim 19 or 20.

* * * * *